US010222955B2

(12) United States Patent
Ligman et al.

(10) Patent No.: US 10,222,955 B2
(45) Date of Patent: Mar. 5, 2019

(54) AUTOMATICALLY CAPTURING USER INTERACTIONS AND EVALUATING USER INTERFACES IN SOFTWARE PROGRAMS USING FIELD TESTING

(71) Applicant: International Business Machines Corporation, Armonk, NY (US)

(72) Inventors: Joseph W. Ligman, Wilton, CT (US); Marco Pistoia, Amawalk, NY (US); John Ponzo, Yorktown Heights, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/923,534

(22) Filed: Oct. 27, 2015

(65) Prior Publication Data

US 2016/0048443 A1 Feb. 18, 2016

Related U.S. Application Data

(62) Division of application No. 13/968,872, filed on Aug. 16, 2013, now Pat. No. 9,836,193.

(51) Int. Cl.
*G06F 11/36* (2006.01)
*G06F 3/0484* (2013.01)
*G06F 3/0488* (2013.01)

(52) U.S. Cl.
CPC ........ *G06F 3/04842* (2013.01); *G06F 3/0484* (2013.01); *G06F 3/0488* (2013.01); *G06F 11/3664* (2013.01); *G06F 11/3672* (2013.01)

(58) Field of Classification Search
CPC .................. G06F 3/048; G06F 11/3466; G06F 2201/865; G06F 11/3644; G06F 11/3636; H04L 67/22
See application file for complete search history.

(56) References Cited

U.S. PATENT DOCUMENTS 5,781,720 A 7/1998 Parker et al.
6,158,049 A 12/2000 Goodwin et al.
(Continued)

FOREIGN PATENT DOCUMENTS

CN 101821707 A 9/2010
CN 102142016 A 8/2011
(Continued)

OTHER PUBLICATIONS

CN Office Action dated Aug. 23, 2017. Application No. 201480045118.4.
(Continued)

*Primary Examiner* — Sang H Kim
(74) *Attorney, Agent, or Firm* — Harrington & Smith

(57) ABSTRACT

A method includes analyzing, on a first computing device, data from second computing device(s) of user interaction with a user interface of an application previously executed on the second computing device(s). The data corresponds to events caused by the user interaction with the user interface of the application. The first computing device generates representation(s) of the analyzed data and outputs the representation(s) of the user interaction. Another method includes capturing and logging, by a computing device, events caused by user interaction with a user interface of an application when the application is executed on the computing device. In response to a trigger, data comprising the captured and logged events is sent toward another computing device. Another method includes instrumenting a measurement library into an application to create an instrumented version of the application, and sending the instrumented application to computing device(s). Methods, apparatus, software, and computer program products are disclosed.

15 Claims, 10 Drawing Sheets

(56) References Cited

U.S. PATENT DOCUMENTS

| | | |
|---|---|---|
| 7,379,600 B2 | 5/2008 | Derks et al. |
| 2005/0182750 A1* | 8/2005 | Krishna .............. G06F 11/3438 |
| 2007/0174490 A1 | 6/2007 | Choi |
| 2008/0282230 A1 | 11/2008 | Belvin et al. |
| 2009/0259992 A1 | 10/2009 | Cormier et al. |
| 2010/0153548 A1 | 6/2010 | Wang et al. |
| 2010/0161506 A1 | 6/2010 | Bosenick et al. |
| 2011/0289481 A1 | 11/2011 | Franklin et al. |
| 2011/0320880 A1 | 12/2011 | Wenig et al. |
| 2012/0054057 A1 | 3/2012 | O'Connell et al. |
| 2013/0019170 A1 | 1/2013 | Mounty et al. |
| 2014/0068498 A1* | 3/2014 | Olsen ..................... G06F 11/32 715/781 |
| 2014/0143304 A1 | 5/2014 | Hegarty et al. |
| 2014/0280517 A1* | 9/2014 | White .................... H04L 67/04 709/203 |
| 2014/0380282 A1* | 12/2014 | Ravindranath Sivalingam ........... G06F 11/3476 717/128 |

FOREIGN PATENT DOCUMENTS

| | | |
|---|---|---|
| CN | 102193862 A | 9/2011 |
| CN | 102279791 A | 12/2011 |

OTHER PUBLICATIONS

Barkol et al., "Semantic Automation from Screen Capture", http://www.hpl.hp.com/techreports/2009/HPL-2009-161.html, HPL-2009-161, 11 pages, accessed Dec. 11, 2012.

Hunt et al., "Detours: Binary Interception of Win32 Functions", Third USENIX Windows NT Symposium, USENIX, Jul. 1999, 9 pages, accessed Dec. 11, 2012.

\* cited by examiner

AUTOMATICALLY CAPTURING USER INTERACTIONS AND EVALUATING USER INTERFACES IN SOFTWARE PROGRAMS USING FIELD TESTING

CROSS-REFERENCE TO A RELATED U.S. PATENT APPLICATION

This application is a divisional of copending U.S. patent application Ser. No. 13/968,872 filed Aug. 16, 2013, the disclosure of which is incorporated by reference herein in its entirety.

BACKGROUND

This invention relates generally to applications executed on computer systems and, more specifically, relates to field testing those applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Mobile-application market places are growing in size as developers quickly release software into a global market. As new categories of mobile-application categories are created, the phenomenon of being first to market within an application category is quickly replaced with competition among similar application offerings. It is only after an application receives positive reviews and ratings from multiple end users that a clear application category leader is defined. Feedback of this nature is subjective, typically describing a user's overall experience when interacting with an application. Developers determined to maximize impact of a mobile application require the ability to evaluate and analyze usage paradigms of an application prior to launch. This presents an ongoing challenge for developers and product owners: how can application usage be tested and analyzed beyond a merely subjective metric, so that remedial design/implementation actions can be taken prior to an application being made generally available?

Tools provided within Mobile Software Development Kits (Mobile SDKs) allow for a designer/developer to create top-level view containers and associated controls. Alternatively, developers can programmatically create view containers with custom layouts and controls, which equivalently are compiled into a format that is consumable by a targeted mobile device. Additionally, tools also exist to debug compiled applications, as well as to analyze unit tests of encapsulated functions within an application running in a 'test' mode. However, these approaches are limited in that they do not capture application usage focused towards the direct interaction with the user interface in real-world situations, typically referred to as 'field testing'.

Such field testing, while useful, is typically limited to a number of so-called "beta testers". Even a relatively simple software program can have many layouts and controls, and beta testers may not test all or many of the possible combinations of layouts and controls. Consequently, it would be beneficial to improve the testing of software programs.

BRIEF SUMMARY

This section has examples of possible implementations of the exemplary embodiments. This section is not intended to be limiting.

In a first exemplary embodiment, a method includes analyzing, on a first computing device, data from at least one second computing device of user interaction with a user interface of an application previously executed on the at least one second computing device. The data corresponds to events caused by the user interaction with the user interface of the application. The first computing device and the at least one second computing devices are different. The method includes generating by the first computing device one or more representations of the analyzed data and outputting by the first computing device the one or more representations of the user interaction with the user interface of the application.

In a further exemplary embodiment, a computing device includes means for analyzing, on the computing device, data from one or more other computing devices of user interaction with a user interface of an application previously executed on the one or more other computing devices, the data corresponding to events caused by the user interaction with the user interface of the application, wherein the computing device and the one or more other computing devices are different; means for generating by the computing device one or more representations of the analyzed data; and means for outputting by the computing device the one or more representations of the user interaction with the user interface of the application.

An additional exemplary embodiment is a computer program product, comprising a computer readable storage medium having computer readable program code embodied therewith, the computer readable program code comprising: code for analyzing, on a first computing device, data from at least one second computing device of user interaction with a user interface of an application previously executed on the at least one second computing device, the data corresponding to events caused by the user interaction with the user interface of the application, wherein the first computing device and the at least one second computing devices are different; code for generating by the first computing device one or more representations of the analyzed data; and code for outputting by the first computing device the one or more representations of the user interaction with the user interface of the application.

An additional exemplary embodiment is a computing device, including a memory comprising computer-readable code and one or more processing units. The one or more processing units and the memory are configured in response to execution of the computer-readable code to cause the computing device to perform the following: analyzing, on the computing device, data from at least one other computing device of user interaction with a user interface of an application previously executed on the at least one other computing device, the data corresponding to events caused by the user interaction with the user interface of the application, wherein the computing device and the at least one other computing devices are different; generating by the computing device one or more representations of the analyzed data; and outputting by the computing device the one or more representations of the user interaction with the user interface of the application.

A further exemplary embodiment is a method that includes receiving an application and instrumenting a measurement library into the application to create an instrumented version of the application. The measurement library is defined to capture and log events caused by user interaction with a user interface of the instrumented application when the instrumented application is executed on a computing device. The instrumented application is sent to one or more computing devices.

A further exemplary embodiment is a computer system including: means for receiving an application; means for instrumenting a measurement library into the application to create an instrumented version of the application, wherein the measurement library is defined to capture and log events caused by user interaction with a user interface of the instrumented application when the instrumented application is executed on a computing device; and means for sending the instrumented application to one or more computing devices.

An additional exemplary embodiment is a computer program product, comprising a computer readable storage medium having computer readable program code embodied therewith, the computer readable program code comprising: code for receiving an application; code for instrumenting a measurement library into the application to create an instrumented version of the application, wherein the measurement library is defined to capture and log events caused by user interaction with a user interface of the instrumented application when the instrumented application is executed on a computing device; and code for sending the instrumented application to one or more computing devices.

A computer system includes a memory comprising computer-readable code and one or more processing units. The one or more processing units and the memory are configured in response to execution of the computer-readable code to cause the computer system to perform the following: receiving an application; instrumenting a measurement library into the application to create an instrumented version of the application, wherein the measurement library is defined to capture and log events caused by user interaction with a user interface of the instrumented application when the instrumented application is executed on a computing device; and sending the instrumented application to one or more computing devices.

Another exemplary embodiment is a method that includes capturing and logging, by a computing device, events caused by user interaction with a user interface of an application when the application is executed on the computing device. The method includes sending, in response to a trigger, data comprising the captured and logged events toward another computing device.

A further exemplary embodiment is a computing device comprising: means for capturing and logging, by a computing device, events caused by user interaction with a user interface of an application when the application is executed on the computing device; and means for sending, in response to a trigger, data comprising the captured and logged events toward another computing device.

An additional exemplary embodiment is a computer program product, comprising a computer readable storage medium having computer readable program code embodied therewith, the computer readable program code comprising: code for capturing and logging, by a computing device, events caused by user interaction with a user interface of an application when the application is executed on the computing device; and code for sending, in response to a trigger, data comprising the captured and logged events toward another computing device.

An additional exemplary embodiment is a computing device including a memory comprising computer-readable code and one or more processing units. The one or more processing units and the memory are configured in response to execution of the computer-readable code to cause the computing device to perform the following: capturing and logging, by the computing device, events caused by user interaction with a user interface of an application when the application is executed on the computing device; and sending, in response to a trigger, data comprising the captured and logged events toward another computing device.

BRIEF DESCRIPTION OF THE SEVERAL VIEWS OF THE DRAWINGS

FIG. 9, including

DETAILED DESCRIPTION

Although primary emphasis is placed below on mobile applications, field testing of applications is applicable to many different types of applications. For instance, many automobiles have interactive displays in them, and such interactive displays are designed and defined using applications. These, applications can be field tested. Furthermore, desktop computers have user interfaces (UIs) for applications that can be field tested. Moreover, the "app" model that is applied to mobile devices such as smartphones and tablets is being applied to desktop and portable computers and may be applied in the future to other platforms, such as set-top boxes, smart televisions, and the like. Therefore, the instant exemplary embodiments have wide applicability and the FIGS. 1 and 2 illustrate such wide applicability.

Figure 1:
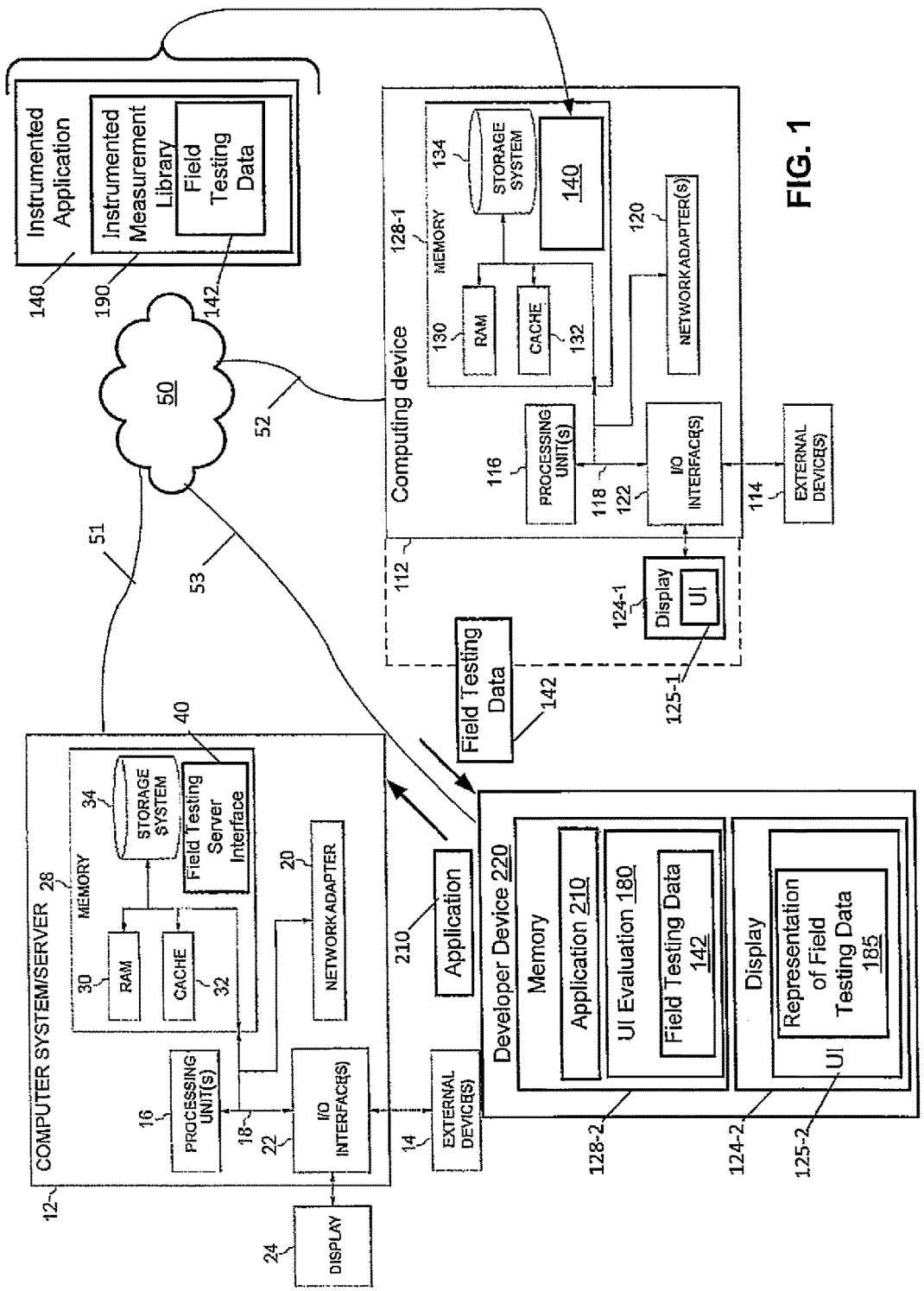
FIG. 1 is a block diagram of a computing device and a server in communication via a network, in accordance with an exemplary embodiment of the instant invention.
Figure 2:
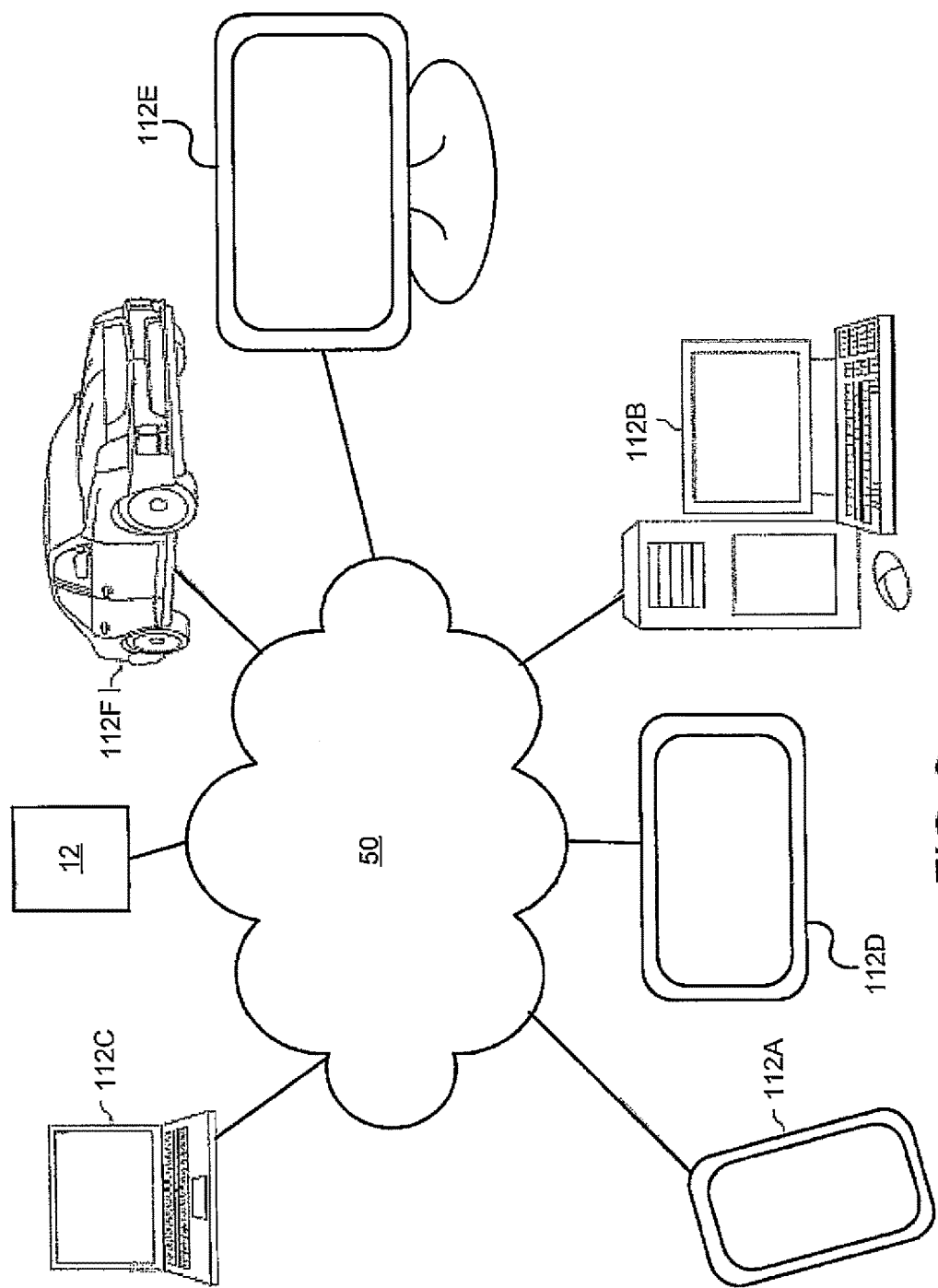
FIG. 2 depicts a networked environment according to an exemplary embodiment of the present invention.

Reference is made now to FIG. 1, which shows a block diagram of a computing device and a server in communication via a network, in accordance with an exemplary embodiment of the instant invention. FIG. 1 is used to provide an overview of a system in which exemplary embodiments may be used and to provide an overview of certain exemplary embodiments. In FIG. 1, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 1, computer system/server 12 is shown in the form of a general-purpose computing device. The components of computer system/server 12 may include, but are not limited to, one or more processing units 16 (e.g., processor(s), a system memory 28, and a bus 18 that couples various system components including system memory 28 to the one or more processing units 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12 typically includes a variety of computer system readable media, such as memory 28. Such media may be any available media that is accessible by computer system/server 12, and such media includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a removable, non-volatile memory, such as a memory card or "stick" may be used, and an optical disk drive for reading from or writing to a removable, non-volatile optical disk such as a CD-ROM, DVD-ROM or other optical media can be provided. In such instances, each can be connected to bus 18 by one or more I/O (Input/Output) interfaces 22.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via, e.g., I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

The computing device 112 also comprises a memory 128-1, one or more processing units 116, one or more I/O interfaces 122, and one or more network adapters 120, interconnected via bus 118. A memory 128 may comprise non-volatile and/or volatile RAM, cache memory 132, and a storage system 134. Depending on implementation, a memory 128 may include removable or non-removable non-volatile memory. The computing device 112 may include or be coupled to the display 124-1, which has a UI 125-1. Depending on implementation, the computing device 112 may or may not be coupled to external devices 114. A display 124 may be a touchscreen, flatscreen, monitor, television, projector, as examples. A UI 125 may be any UI for an application and/or an operating system for the particular computing device 112. The bus 118 may be any bus suitable for the platform, including those buses described above for bus 18. The memories 130, 132, and 134 may be those memories 30, 32, 34, respectively, described above. The one or more network adapters 120 may be wired or wireless network adapters. The I/O interface(s) 122 may be interfaces such as USB (universal serial bus), SATA (serial AT attachment), HDMI (high definition multimedia interface), and the like. The one or more processing units 16, 116 may be any suitable controller(s) for controlling operation of a respective computing device, such as general purpose processors, single- or multiple-core processors, application specific integrated circuits, systems-on-a-chip, programmable logic, and the like.

A developer device 220 is also shown in FIG. 1. The developer device 220 can be considered to be similar to the computing device 112 and thus the internals (other than the memory 128-2, display 124-2 and UI 125-2) of the developer device 220 are not shown. The developer device 220 includes a memory 128-2 comprising an application 210 and a UI evaluation tool 180, which comprises field testing data 142.

In this example, the computer system/server 12, the computing device 112 and the developer device 220 are interconnected via network 50 and links 51, 52, and 53. Network 50 is typically the Internet, but may be other networks such as a corporate network.

Elements of, and interactions between elements in, the system in FIG. 1 are explained in more detail below. However, a brief introduction of exemplary interactions is now presented. A typical operation might be that a developer of an application 210 uploads, using the developer device 220, the application 210 to the field testing server interface 40. The field testing server interface 40 then instruments the application 210 to create the instrumented application 140. A computing device 112 may be, e.g., "pushed" the instrumented application 140, or the computing device 112 could download the instrumented application 140, e.g., as an update to a non-instrumented version of the application already on the computing device 112. The instrumented measurement library 190 gathers field testing data 142 during the time a user of the computing device 112 uses the instrumented application 140. The field testing data 142 make take many different forms, but one potential form is a log as described in FIG. 4. The log provides detailed metrics relating to event interaction for a user's interactions with the UI 125-1 of the instrumented application 140. After some period of time, the instrumented application 140 (e.g., under direction of the instrumented measurement library 190 or via a trigger from the field testing server interface 40) sends the field testing data 142 to the field testing service interface 40, which then sends the field testing data 142 to the developer device 220.

The developer, using the developer device, then has data about how actual users use his or her application 210. The UI evaluation tool 180, for instance, can display certain information about the use of the application 210 by users of the computing devices 112. This data 142 can help the user improve the application 210. For instance, using the field testing data 142, the UI evaluation tool 180 can show multiple representations 185 of field testing data. Using these representations 185, the developer can determine whether the UI for the application 210 has confusing aspects, which features are being used or not used in the application 210, how users interact with the application, and the like. In an exemplary embodiment, the UI evaluation tool 180 is computer-readable code that, in response to execution of the code by processing unit(s) 116, causes the developer device 220 to perform operations described herein.

It is noted that the field testing data 142 is assumed to be the same in the figures herein on the computer system/server 12, the computing device 112, and the developer device 220. However, the field testing data 142 might be different on one or more of the devices and also might be "packaged" for communication over the network 50. For instance, the computing device 112 might take more data than is communicated to the computer system/server 12. As another example, regarding packaging the field testing data 142, the computing device 112 might compress the field testing data 142 prior to communication of the field testing data 142 to the computer system/server 12, and also might put the field testing data 142 in a known format so that the computer system/server 12 (and, e.g., the UI evaluation tool 180) can interpret elements of the field testing data 142.

The UI evaluation tool 180 is shown in FIG. 1 as being executed on the developer device 220. However, the UI evaluation tool 180 could be executed, in whole or part, on the computer system/server 12, if desired. For instance, the developer could log into an account on the computer system/server 12 in order to view the representation 185 of field testing data.

The field testing server interface 40 is, in one example, computer-readable code that, in response to execution of the code by the processing unit(s) 16, causes the computer system/server 12 to perform operations described herein. The instrumented application 140 and the instrumented measurement library 190 are, in one example, computer-readable code that, in response to execution of the code by the processing unit(s) 216, cause the computing device 112 to perform operations described herein.

Turning to FIG. 2, a networked environment is illustrated according to an exemplary embodiment. In this example, the computer system/server 12 is shown separate from network 50, but could be part of the network. There are A through E different computing devices 112 shown: smartphone 112A, desktop computer 112B, laptop 112C, tablet 112D, television 112E, and automobile computer system 112F. Not shown but equally applicable are set-top boxes and game consoles. These are merely exemplary and other devices may also be used. Thus, although the examples provided below place primary emphasis on mobile devices, such as the smartphone 112A or the tablet 112D, the instant techniques may be applied to many other computing devices.

Now that an overview of a system and an exemplary embodiment has been provided, more detail about additional exemplary embodiments is provided.

Exemplary embodiments herein describe systems, methods, articles of manufacture, and apparatus for automatically capturing user interactions and evaluating user interfaces in software applications using field testing. It is noted that the terms "software programs", "software applications", and "applications" are used interchangeably herein.

Exemplary advantages of exemplary embodiments herein enable automatic evaluations of UIs within an application, and provide developers the advantage of understanding the interaction patterns of users. Another exemplary advantage is that exemplary embodiments enable the presentation of all potential user controls and views within an application, including programmatically created controls, collected as sequences that can be visualized by designers and testers.

Exemplary embodiments herein may address the following.

1) Automatic evaluations of user interfaces implemented within an application have a direct impact on the application design of native user interfaces and give the application owner an advantage in determining individual interaction points within interface views, while also providing a visualization of user target controls that are displayed on the device while running these applications.

2) Having a transparent library to solve the problem of measuring action metrics directly on native user interface widgets, without a developer's intentional inclusion of measurement conditions which would otherwise alter an application's intended execution path.

This approach also allows for the visualization of interaction paths within an application between sets of top-level views, enabling a designer to understand how a user transitions through various states of the life-cycle of an application.

The overall system may allow an application designer to perform one or more of the following tasks on a mobile application:

Visually review all of the application top-level views as presented on screen to a user;

Inspect an individual component within a given view, to quantitatively measure usage interaction;

Observe the frequency of paths of interaction between views within an application, as navigated by an end user during a field test;

Visualize application screenshots of an executing mobile application; and/or

Visualize the hierarchical top-level view objects and associated encapsulated user interface controls of an executable mobile application.

Figure 3:
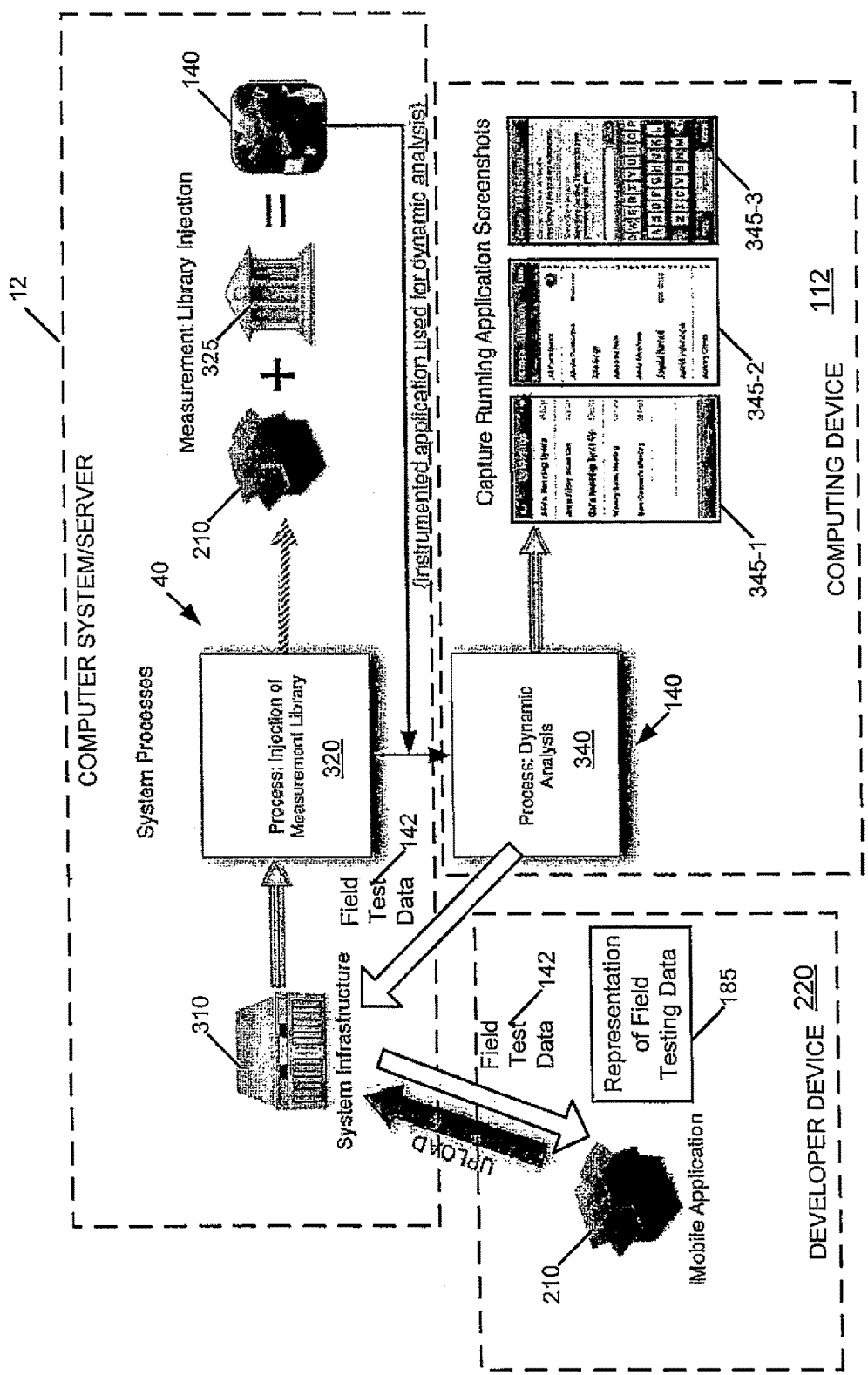
FIG. 3 is an illustration of an exemplary system design.

Turning to FIG. 3, this figure is an illustration of an exemplary system design. FIG. 3 illustrates an overall system that may be used to inspect and visualize aspects of a mobile application. In the example of FIG. 3, the computer system/server 12 is shown being represented in part by a system infrastructure 310. A developer, using the developer device 220, uploads the mobile application 210 to the system infrastructure 310. The system infrastructure 310, e.g., under direction of the field testing server interface 40, performs the process 320 of injection of the measurement library 325 into the application 210 to create the instrumented application 140. If the application 210 is uploaded as source code, the application 210 can add one or more links into the source code so that an executable application will call the measurement library 325 at appropriate times. If the application 210 is uploaded as an executable file, it is possible to add the measurement library 325 to the application 210. For instance, for the iOS and Android operating systems for mobile platforms, which are used as examples herein (although the exemplary embodiment are not limited thereto), it is possible to add the measurement library 325 to executable code. On iOS (a mobile operating system developed by Apple, Inc.), for instance, the measurement library 325 may be injected through method swizzling, which is a technique that allows for redirecting calls to certain methods to other methods. On Android (a mobile operating system developed by Google, Inc.) the measurement library 325 may be injected via class loading and/or bytecode rewriting. Similar injection is possible for other operating systems. The instrumented application 140 after injection of the measurement library 325 then contains the instrumented measurement library 190 as shown in FIG. 1.

The instrumented application 140 is communicated to the computing device 112. In response to a user using the instrumented application 140, the instrumented application 140 (e.g., or more particularly the instrumented measurement library 190) performs the process 340 of dynamic analysis of the instrumented application 140. There are many different types of field testing data 142 that can be taken with respect to the instrumented application 140. In the example of FIG. 3, the dynamic analysis captures running application screenshots 345-1, 345-2, and 345-3. Such screenshots (e.g., saved in JPEG, Joint Photographic Experts Group, or other formats) may be stored as part of field testing data 142. Additionally, actions by the user that caused the screens to change may also be kept, such that the sequence of screens may be examined later.

At some point, the instrumented measurement library 190 sends field testing data 142 to the system infrastructure 310. The field testing data 142 sent by the measurement library can happen in many ways. For instance, the transfer could be set to occur every 10 seconds—so any collected data up to that point would be sent to the server. However, the library 190 could be initialized such that the transfer occurs more frequently if connected to a Wi-Fi (or other high speed) connection, or less frequently if on a cellular connection; or alternatively, the data could be collected locally in a compressed form and then sent to the server when for instance a space limit has been reached; the application finishes its life-cycle; or if the library "senses" (i.e., receives a notification) that an optimal network connection exists for the data upload to occur. Furthermore, the data may be sent via manual interaction by the tester (e.g., after testing, the user goes into a settings pane provided by the measurement library 190 and selects "Upload collected data"). The system infrastructure 310 then sends the field testing data 142 to the developer device 220. The developer, using the developer device 220, can then create a representation 185 of the field testing data 142. For instance, the application screenshots 345-1, 345-2, and 345-3 could be represented, e.g., in the order in which the screenshots occurred during execution of the instrumented application 140. Additionally, the actions by the user that caused the screens to change may also be represented.

Figure 4:
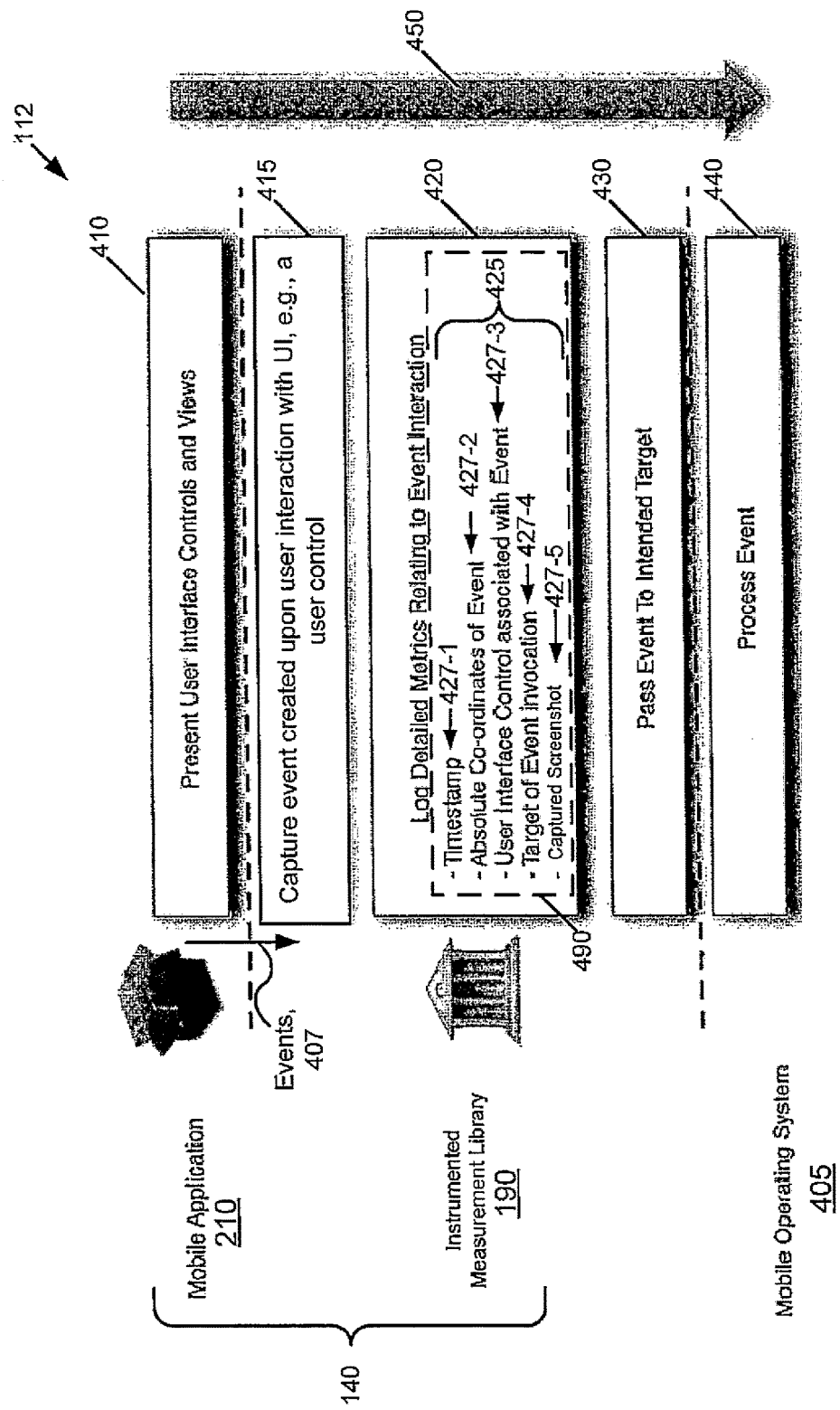
FIG. 4 is an illustration of intermediation of a measurement library.

The instrumented measurement library 190 performs the dynamic analysis 340. This client measurement library is able to intermediate, as illustrated by FIG. 4, between an executing mobile application and the mobile operating system upon which the application execution takes place. FIG. 4 contains an illustration of components on the computing device 112. These components are the mobile application 210, the instrumented management library 190, and the mobile operating system (OS) 405. The instrumented application 140 includes the mobile application 210 and the measurement library 190.

Reference 450 illustrates a path taken for events passed from the mobile application 210 and the mobile operating system 405. In block 410, the mobile application 210 performs the operation of presenting UI controls and views on the UI 125-1 of the display 124-1. Events 407 are captured by the instrumented measurement library 190. Thus, in block 415, the measurement library 190 performs the operation of capturing event(s) created upon user interaction on the UI, e.g., with a user control (or other parts of the UI). When the user performs touch interactions with a UI for a touchscreen, the touch interactions create events 407 such as a (short) screen press. Other events 407 may include, e.g., a long press or a swipe (e.g., including velocity information). The click/touch event may or may not trigger an action—it depends on if there is a user control that receives the "event". It is desirable to capture all "events", regardless of their outcome. For non-touchscreens, the events could be mouse clicks, mouse movements, keystrokes, and the like. In an exemplary embodiment, the instrumented measurement library 190 creates, as part of field testing data 142, a log 490. In block 420, the instrumented measurement library 190 logs detailed metrics relating to event interaction in the log 490. An exemplary entry 425 in the log 490 is shown. The entry 425 includes a number of data items 427: a timestamp 427-1; absolute coordinates of the event 427-2; the user interface control associated with the event 427-3; a target of event invocation 427-4; and a captured screenshot 427-5. The timestamp is simply an indication of the time the event occurs. The absolute coordinates of the event are the coordinates on the display 124 for a user interaction. The user interface control associated with an event is a UI control (i.e., an interactive component for which the user is able to interact) associated with the event. Such UI controls can include, e.g., buttons, text fields, seek bars, checkboxes, zoom buttons, toggle buttons, and the like. It should be noted that there may be no user control for the event, such as if the user presses a touchscreen in an area where there is no user control. The target of event invocation may be a user control on the UI or a location on the UI not associated with a user control. The captured screenshot is a screenshot (taken, e.g., in response to occurrence of the event) of the UI 125, stored in a format such as JPEG. The data items 427 are merely exemplary and there may be additional or fewer data items. For instance, information about the event 407 (e.g., short press, long press, swipe) may also be retained as a data item 427.

It can be seen that the log 490 provides quite a bit of information, and since each event is time stamped, the user's interactions with UI 125-1 of the mobile application 210 may be recreated (e.g., by the UI evaluation tool 180). In an exemplary embodiment, all of the data items 427 would be collected for each event. (e.g., timestamp, co-ordinates of event, intended target of event, screenshot—if already previously taken, then just a reference to the existing screenshot). For the FIG. 6 example regarding the "concentrated interaction", there are events generated for each interaction, but because the interactions are occurring on the title bar, and not an actionable control, no action occurs. Regardless, it is still desirable to capture all the interactions and their corresponding events, and log them for analysis.

In block 430, the instrumented measurement library 190 passes the event to the intended target. The target is a component like a button, control, an image, and the like that manifests itself as an object derived from a class defined by a Software Development Kit (SDK) (e.g., a 'UIButton' for iOS, an 'Image' for Android, and the like). In block 440, the intended target of the mobile operating system 405 processes the event.

Figure 5:
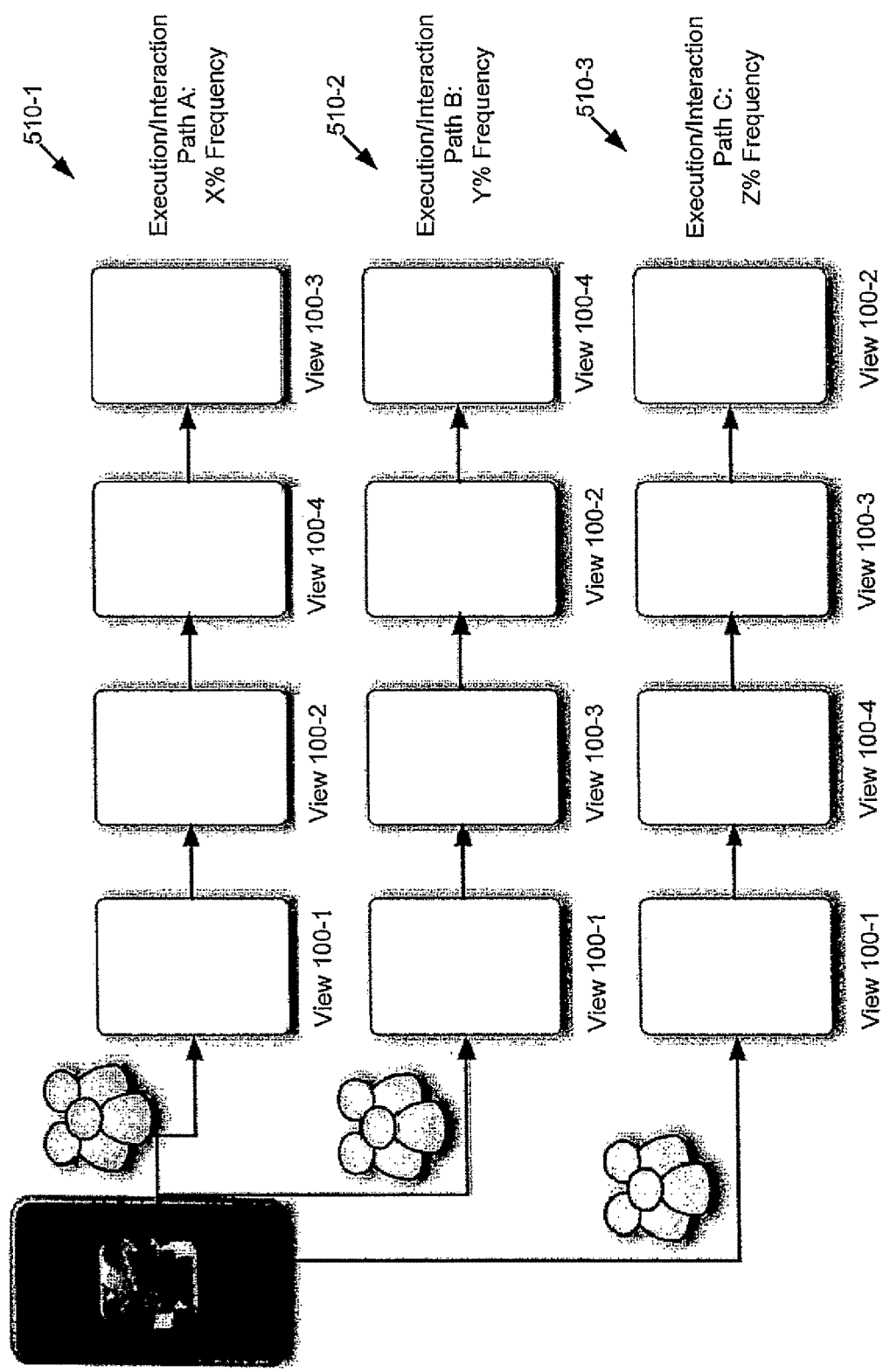
FIG. 5 is an illustration of frequency of execution/interaction paths when a user has navigated between application views.

Turning to FIG. 5, an illustration is shown of frequency of execution/interaction paths when navigating between application views. Therefore, this exemplary embodiment allows for a method and protocol for tracking the navigation of top-level views within an application. In the context of this disclosure, screenshots are static images taken of views. For example, in a phonebook directory application, there may be a view that shows all contacts listed in a table (i.e., viewX); and another view that allows for one to update his or her information in one of the contact entries (i.e., viewY). As a use case, one may update his or her name in viewY, and a screenshot would be taken of that view. Next, one may navigate to viewX, where upon a screenshot would be taken, and then return back to viewY and the person may save his or her phone number in viewY—which would trigger another screenshot to be taken of that updated view. So then there would be two screenshots of viewY, and one screenshot of viewX. In the example of FIG. 5, the execution/interaction path A 510-1 includes views 100-1, 100-2, 100-4, and 100-3, in this order where view 100-1 occurs first in time and view 100-3 occurs last in time. In FIG. 5, each view is represented as a screen. This path A 510-1 occurred with X % frequency relative to all paths 510. The execution/interaction path A 510-2 includes views 100-1, 100-3, 100-2, and 100-4, in this order with view 100-1 occurring first in time and view 100-4 occurring last in time. This path 13 510-2 occurred with Y % frequency relative to all paths 510. The execution/interaction path C 510-3 includes views 100-1, 100-4, 100-3, and 100-2, in this order with view 100-1 occurring first in time and view 100-2 occurring last in time. This path C 510-3 occurred with Z % frequency relative to all paths 510.

The instrumented measurement library 190 stores data to allow the paths 510 to be determined. The paths 510 may be determined, e.g., by a UI evaluation tool 180, for instance, by examining the timestamps 427-1 and determining a sequence of views. For example, based on what is in the log (e.g., timestamp, co-ordinates of event, intended target of event, screenshot), a path can be constructed, e.g., as illustrated by the following:

at time 't' an event was triggered at co-ordinates X,Y on titlebar C in view UI-1, as recorded in Screenshot-1;
at time 't+1' an event was triggered at co-ordinates X+1,Y+1 on titlebar C in view UI-1, as recorded in Screenshot-1;
at time 't+2' an event was triggered at co-ordinates X+5,Y+7 on button B in view UI-1, as recorded in Screenshot-2;
at time 't+3' an view transition event was triggered at co-ordinates 0,0 to view UI-2, as recorded in Screenshot-3;
at time 't+4' an event was triggered at co-ordinates X,Y on banner D in view UI-2, as recorded in Screenshot-3.

From the above five exemplary data points, one can infer the transition from view UI-1 to view UI-2, but only after repeated touches on the titlebar C in view UI-1. Screenshot-1 and Screenshot-2 are visual representations of the same view UI-1, but in different states (e.g., pre and post-button B being pressed). Because the button press resulted in a new view appearing, a new Screenshot-3 of view UI-2 was taken.

The UI evaluation tool 180 can therefore create FIG. 5 as the representation 185 of field testing data, although this data may be presented in many other ways (such as having the views 100 for each path 510 being listed in text instead of being represented by screens as in FIG. 5).

An application designer can therefore analyze the paths 510 taken by a user using the application 210, 140. This could be useful for many reasons, such as the designer determining that certain paths 510 are unexpected (e.g., due to programming error), or that certain features are not being used.

Figure 6:
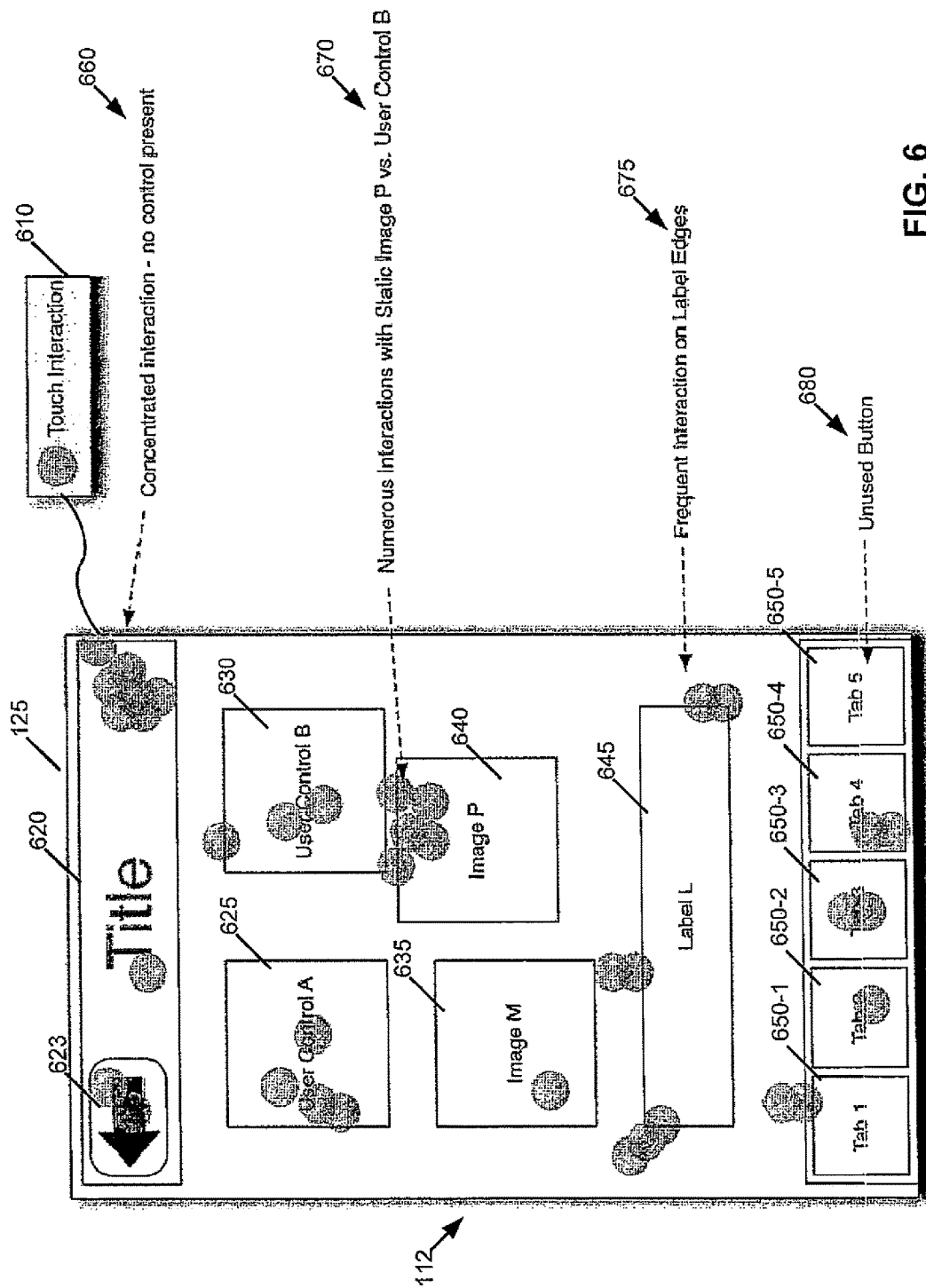
FIG. 6 is an illustration of tracking targeted touch interactions with specific UI controls and other areas of a UI for an application.

The exemplary embodiments also provide a method and protocol as for tracking targeted interaction with specific user interface controls. This is illustrated by FIG. 6. The illustration of FIG. 6 may be created by an UI evaluation tool 180. Many different touch interactions 610 are shown on a (simulated version of a) UI 125-1 of a display 124-1 of a computing device 112. When the user performs touch interactions with a UI, the touch interactions create events such as a (short) screen press. Other events may include, e.g., a long press or a swipe (e.g., including velocity information). For simplicity, the touch interactions 610 shown on FIG. 6 are assumed to be short screen presses. Thus, such touch interactions 610 are representations of short presses (in this example) that may be generated, e.g., by the UI evaluation tool 180 using, e.g., the absolute coordinates of the event 427-2 stored in log 490 for a particular screenshot 427-5.

This example shows a title bar 620 and a "back" button 623. There are several user controls 625 (user control A) and 630 (user control B), an image M 635, an image P 640, a label L 645, and buttons 650-1 through 650-5, which are tabs. Using the touch interactions 610, the developer can determine (reference 660) that there is a concentrated action on the title bar 620, but there is no user control present there. That is, performing a touch interaction on the title bar 620 does not cause an action to occur.

For reference 670, this indicates there are numerous interactions with the static image P 640 (where "static" means the image is not a user control, as some images can be user controls), but fewer interactions with the user control B 630. This could indicate that users believe the image P 640 should invoke an action, when the image P 640 does not. Reference 675 indicates there is frequent interaction on edges of the label L 645. For the frequent interaction on label L 645, this analyzed data would indicate that the user is mistakenly touching the label, perhaps confusing the label for a button and expecting an action. This would be valuable feedback for the application creator to consider for future updates to the view. Reference 680 indicates that the button Tab 5, 650-5 is not used. This may indicate a feature that is not used.

Figure 7:
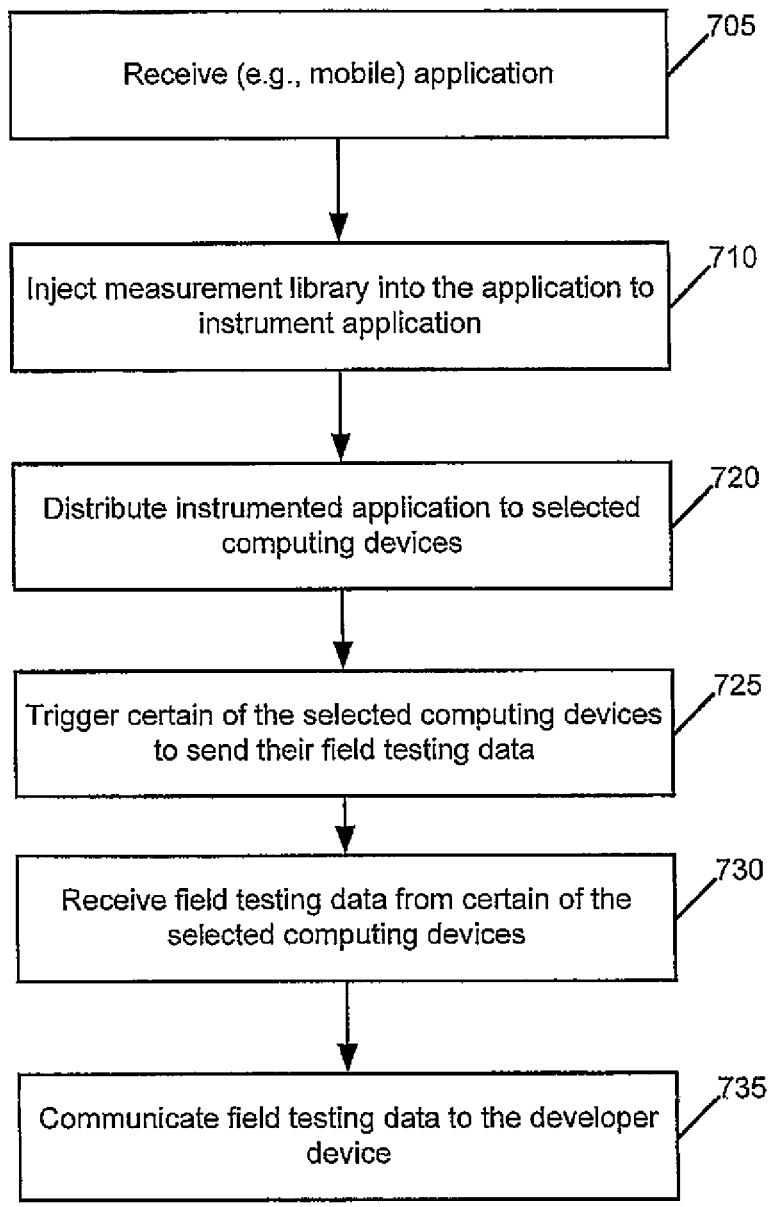
FIG. 7 is a logic flow diagram for automatically capturing user interactions and evaluating user interfaces in software programs using field testing for a field testing server interface, and illustrates the operation of an exemplary method, a result of execution of computer program instructions embodied on a computer readable memory, and/or functions performed by logic implemented in hardware, in accordance with an exemplary embodiment.

Referring to FIG. 7, this figure is a logic flow diagram for automatically capturing user interactions and evaluating user interfaces in software programs using field testing for a field testing server interface. FIG. 7 also illustrates the operation of an exemplary method, a result of execution of computer program instructions embodied on a computer readable memory, and/or functions performed by logic implemented in hardware, in accordance with an exemplary embodiment. The interconnected blocks in this figure may also be considered to be interconnected means for performing the functions in the blocks. The field testing server interface 40 is assumed to cause the computer system/server 12 to perform the blocks in FIG. 7. Many of the operations in FIG. 7 have been described above, e.g., in relation to FIG. 3.

In block 705, the computer system/server 12 receives an application 210. The application 210 may be a mobile application designed to be executed on a mobile computing device 112 such as a smartphone or tablet. In block 710, the computer system/server 12 injects the measurement library 325 into the application 210 to instrument the application and creates the instrumented application 140. In block 720, the computer system/server 12 distributes the instrumented application 140 to selected computing devices. For instance, the distribution can be to any computing device 112 requesting the application, the computer system/server 12 can push the application to selected (possibly all) computing devices 112, and the like.

In block 725, the computer system/server 12 triggers certain of the selected computing devices to send their field testing data. This is optional but is one way for the computing devices 112 (e.g., and the instrumented measurement library 190) to determine the computing devices 112 should send their field testing data 142 to the computer system/server 12. The triggering may be in response to the developer requesting the triggering be performed, or may be performed, e.g., after some time period has elapsed. In block 730, the computer system/server 12 receives field testing data 142 from certain (e.g., or all) of the selected computing devices. In an exemplary embodiment, the computer system/server 12 communicates (block 735) the field testing data 142 to the developer device 220. In another exemplary embodiment, the computer system/server 12 may act to analyze data from the computing devices 112, and can therefore perform the operations of FIG. 9. In this latter example, the designer could use the developer device 220 to access the computer system/server 12, e.g., via a Web interface, and view or receive representations of user interaction with the UI, as described below in reference to FIG. 9.

Figure 8:
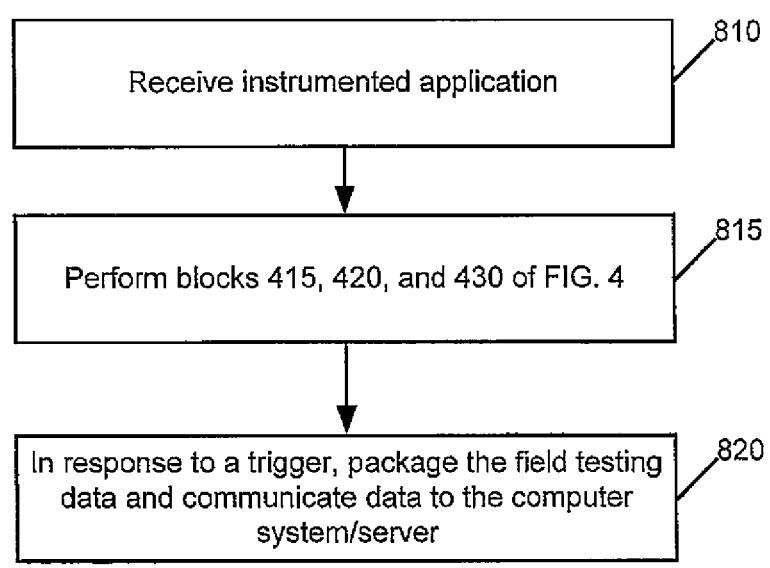
FIG. 8 is a logic flow diagram for automatically capturing user interactions and evaluating user interfaces in software programs using field testing for a computing device having an instrumented application, and illustrates the operation of an exemplary method, a result of execution of computer program instructions embodied on a computer readable memory, and/or functions performed by logic implemented in hardware, in accordance with an exemplary embodiment.

FIG. 8 is a logic flow diagram for automatically capturing user interactions and evaluating user interfaces in software programs using field testing for a computing device having an instrumented application. FIG. 8 also illustrates the operation of an exemplary method, a result of execution of computer program instructions embodied on a computer readable memory, and/or functions performed by logic implemented in hardware, in accordance with an exemplary embodiment. The interconnected blocks in this figure may also be considered to be interconnected means for performing the functions in the blocks.

In block 810, the computing device 112 receives the instrumented application 140. Blocks 815 and 820 are assumed to be performed by the computing device 112, e.g., under direction of the instrumented measurement library 190. In block 815, the instrumented measurement library 190 causes the computing device 112 to perform blocks 415, 420, and 430 of FIG. 4. More specifically, the instrumented measurement library 190 causes the computing device 112 to perform the operation of capturing event(s) created upon user interaction on the UI, e.g., with a user control (or other parts of the UI) (block 415). In block 420, the instrumented measurement library 190 causes the computing device 112 to log detailed metrics relating to event interaction in the log 490. In block 430, the instrumented measurement library 190 causes the computing device 112 to pass the event to the intended target. In block 820, the instrumented measurement library 190 causes the computing device 112 to package the field testing data and communicate the data to the computer system/server 12. This is performed in response to a trigger. The trigger could be received, e.g., from the computer system/server 12 or possibly the developer device 220. The trigger could also be generated by the instrumented measurement library 190, such as by expiration of a time period. The packaging could be simply sending the field testing data 142 to the computer system/server 12 or could be more involved, such as using compression and/or placing the field testing data 142 into a known format.

Figure 9A:
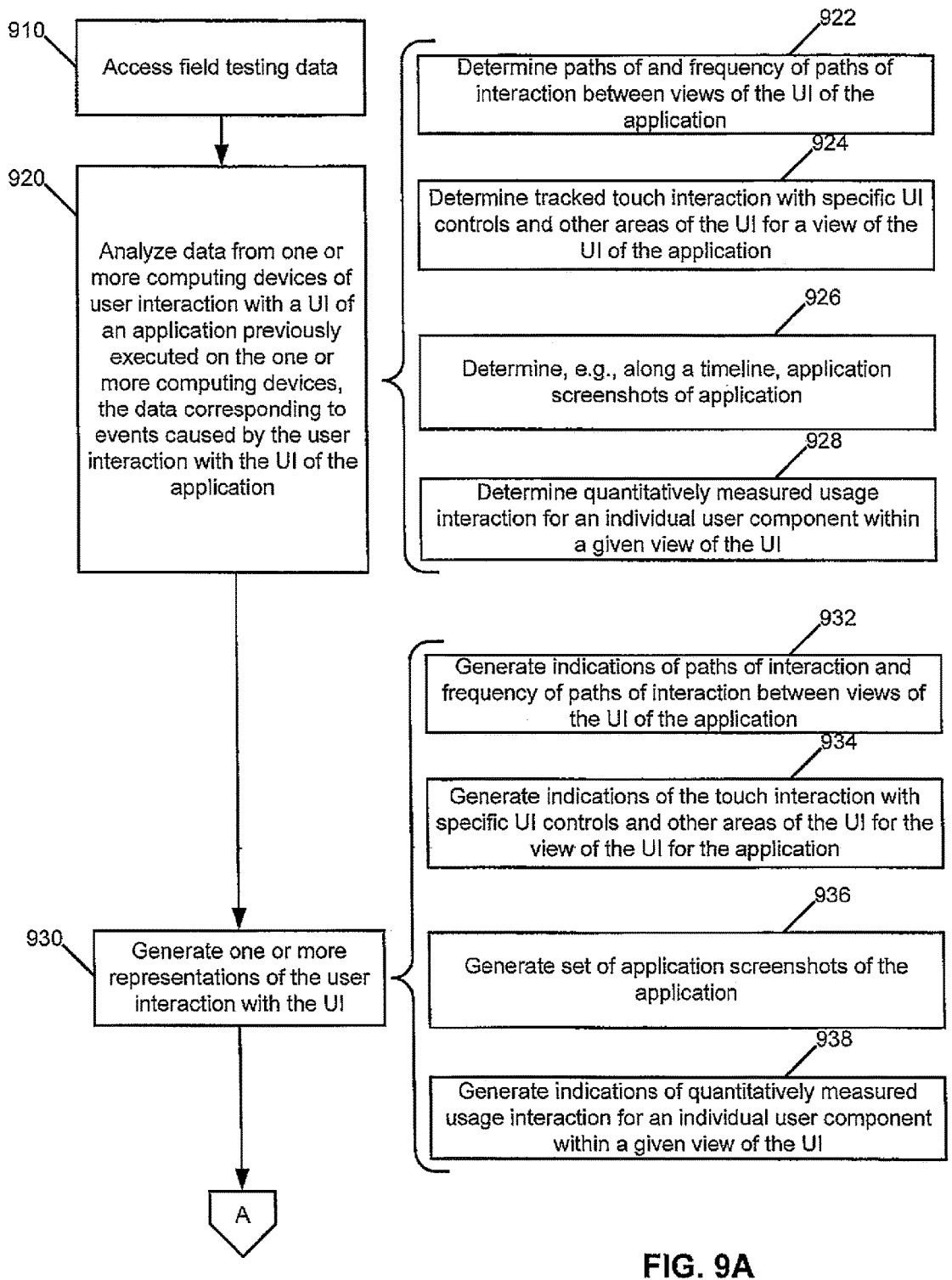
FIGS. 9A and 9B, is a logic flow diagram for automatically capturing user interactions and evaluating user interfaces in software programs using field testing for a UI evaluation tool, and illustrates the operation of an exemplary method, a result of execution of computer program instructions embodied on a computer readable memory, and/or functions performed by logic implemented in hardware, in accordance with an exemplary embodiment.
Figure 9B:
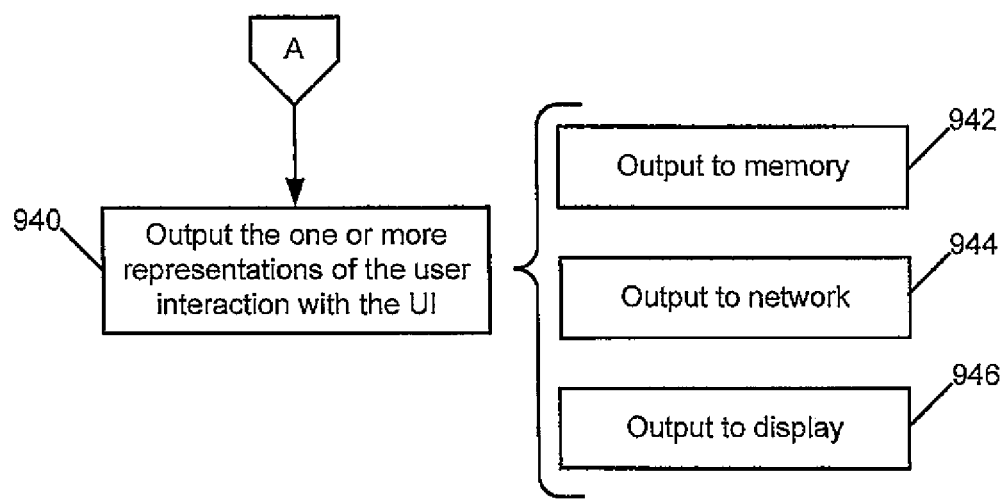

Turning to FIG. 9, including FIGS. 9A and 9B, a logic flow diagram is shown for automatically capturing user interactions and evaluating user interfaces in software programs using field testing for a UI evaluation tool. FIG. 9 also illustrates the operation of an exemplary method, a result of execution of computer program instructions embodied on a computer readable memory, and/or functions performed by logic implemented in hardware, in accordance with an exemplary embodiment. The interconnected blocks in this figure may also be considered to be interconnected means for performing the functions in the blocks.

The blocks in FIG. 9 are assumed to be performed by the developer device 220 under direction of the UI evaluation tool 180. For ease of reference, it is assumed the developer device 220 performs the blocks. In block 910, the developer device 220 accesses the field testing data 142. The field testing data 142 could be received from a single computing device 112, e.g., via the computer system/server 12, or could be received from multiple computing devices 112, e.g., over some time period. The developer device 220 then accesses stored field testing data 142. The blocks in FIG. 9 may be performed, as an example, responsive to input from the designer using the UI evaluation tool 180.

In block 920, the developer device 220 analyzes data from one or more computing devices of user interaction with a user interface of the application previously executed on the one or more devices. As explained above, the data corresponds to events caused by the user interaction with the UI of the application. The data therefore was taken prior to the analyzing and in response to execution of the application on the one or more computing devices. Blocks 922-928 are examples of possible analyses. In block 922, the developer device 220 determines paths of and frequency of paths of interaction between views of the UI of the application. An example of the frequency of paths of interaction between views within the UI of the application is illustrated in FIG. 5. In block 924, the developer device 220 determines tracked touch interaction with specific UI controls and other areas of the UT for a view of the UI of the application. An illustration is shown in FIG. 6 of tracked touch interaction with specific UI controls and other areas of the UI for a view of the UI of the application.

In block 926, the developer device 220 determine, e.g., along a timeline, application screenshots of the application. An example of screenshots 345 is shown in FIG. 3. In the example of FIG. 3, the screenshots 345 could occur in a timeline, such that (e.g., based on timestamps) the screenshot 345-1 occurs before the screenshots 315-2, 315-3, the screenshot 315-2 occurs after the screenshot 345-1 but before the screenshot 315-3, and the screenshot 315-3 occurs last in time, after both the screenshots 315-1, 315-2. In another example, it could be beneficial to determine the screens that emanate from a single view. For instance, in FIG. 5, the views 100-2, 100-3, and 100-4 emanate from the view 100-1. It could be useful to generate a set of views starting with view 100-1, with arrows or other lines connecting the view 100-1 with the views 100-2, 100-3, and 100-4. This would allow a designer to know if other views reachable from the view 100-1 are not being used.

In block 928, the developer device 220 determines quantitatively measured usage interaction for an individual user component within a given view of the UI. For instance, if the designer is particularly interested in the user control A 625 of FIG. 6, the UI evaluation tool 180 could focus on that particular user control.

In block 930, the developer device 220 generates one or more representations of the user interaction with the UI. Blocks 932-938 are examples of block 930, and blocks 932-938 correspond to blocks 922-928, respectively. In block 932, the developer device 220 generates indications of the paths and of frequency of the paths of interaction between views within the UT of the application. FIG. 5 is an example of the indications that might be generated for this scenario.

In block 934, the developer device 220 generates indications of the touch interaction with specific UI controls and other areas of the UI for the view of the UI for the application. FIG. 6 is an example of this.

In block 936, the developer device 220 generates a set of application screen captures of the application. Screenshots 345 in FIG. 3 are an example of this. FIG. 5 may also be considered an example of this, if the views 100 are replaced by screenshots 345.

In block 938, the developer device 220 generates indications of quantitatively measured usage interaction for an individual user component within a given view of the UI. FIG. 6, if limited to showing touch interactions for only the user control A 625 (for instance) is an example of this.

In block 940, the developer device 220 outputs the one or more representations of the user interaction with the UI. Such output may be to one or more of a memory (block 942), a network 50 (block 944) or a display (block 946).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium does not include propagating signals and may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    collecting, by a first computing device, data of user interaction with a plurality of views of a user interface of an application when an instrumented version of the application is executed on the first computing device, the data corresponding to events caused by the user interaction with the plurality of views of the user interface of the application, wherein the data corresponding to at least one of the events corresponds to a first user interaction in an area of the user interface having no user interface control, and wherein the data of the user interaction with each respective view of the plurality of views comprises:
        a screenshot captured by the first computing device in response to occurrence of a first event within the respective view, and
        for the case any subsequent event occurs with the respective view, a reference to the captured screenshot of the respective view; and
    sending, from the first computing device to a different, second computing device, the data of the user interaction in response to a trigger, wherein the data is indicative of tracked touch interaction with specific user interface controls for the views of the user interface of the application that correspond to each of the screenshots, paths of interaction between the screenshots of the user interface, and a frequency of each of the paths of interaction, wherein the instrumented version of the application comprises the application and a measurement library for collecting the data corresponding to the events caused by the user interaction with the user interface of the application.

2. The method of claim 1, wherein the data corresponding to at least one of the events comprises a timestamp the at least one event occurs.

3. The method of claim 2, wherein the data corresponding to the at least one event further comprises absolute coordinates of the at least one event.

4. The method of claim 3, wherein, for the case there is a user interface control corresponding to the at least one event, the data corresponding to the at least one event further comprises an indication of the user interface control corresponding to the at least one event.

5. The method of claim 4, wherein the data corresponding to the at least one event further comprises a target of event invocation for the at least one event.

6. The method of claim 5, wherein the data corresponding to the at least one event further comprises a captured screenshot taken in response to occurrence of the event.

7. The method as in claim 2, wherein the data of the user interaction with each respective view further comprises:
    for the case any subsequent event occurs with the respective view, one or more further timestamps the subsequent event(s) occurs.

8. The method as in claim 1, wherein the events comprise one or more of short presses on a touchscreen of the first computing device, long presses on the touchscreen, or swipes on the touchscreen.

9. A computing device, comprising:
    a non-transitory memory comprising computer-readable code; and
    one or more processors, wherein the one or more processors and the memory are configured in response to execution of the computer-readable code to cause the computing device to perform the following:
        collecting, by the computing device, data of user interaction with a plurality of views of a user interface of an application when an instrumented version of the application is executed on the computing device, the data corresponding to events caused by the user interaction with the plurality of views of the user interface of the application, wherein the data corresponding to at least one of the events corresponds to a first user interaction in an area of the user interface having no user interface control, and wherein the data of the user interaction with each respective view of the plurality of views comprises:
            a screenshot captured by the computing device in response to occurrence of a first event within the respective view, and
            for the case any subsequent event occurs with the respective view, a reference to the captured screenshot of the respective view; and
        sending, from the computing device to another computing device, the data in response to a trigger, wherein the data is indicative of tracked touch interaction with specific user interface controls for the views of the user interface of the application that correspond to each of the screenshots, paths of interaction between the screenshots of the user interface, and a frequency of each of the paths of interaction, wherein the instrumented version of the application comprises the application and a measurement library for collecting the data corresponding to the events caused by the user interaction with the user interface of the application.

10. The computing device of claim 9, wherein the data corresponding to at least one of the events comprises a timestamp the at least one event occurs.

11. The computing device of claim 10, wherein the data corresponding to the at least one event further comprises absolute coordinates of the at least one event.

12. The computing device of claim 11 wherein, for the case there is a user interface control corresponding to the at least one event, the data corresponding to the at least one event further comprises an indication of the user interface control corresponding to the event.

13. The computing device of claim 12, wherein the data corresponding to the at least one event further comprises a target of event invocation for the at least one event.

14. The computing device as in claim 10, wherein the data of the user interaction with each respective view further comprises:
for the case any subsequent event occurs with the respective view, one or more further timestamps the subsequent event(s) occurs.

15. The computing device as in claim 9, wherein the events comprise one or more of short presses on a touchscreen of the computing device, long presses on the touchscreen, or swipes on the touchscreen.

* * * * *